No. 776,917. Patented December 6, 1904.

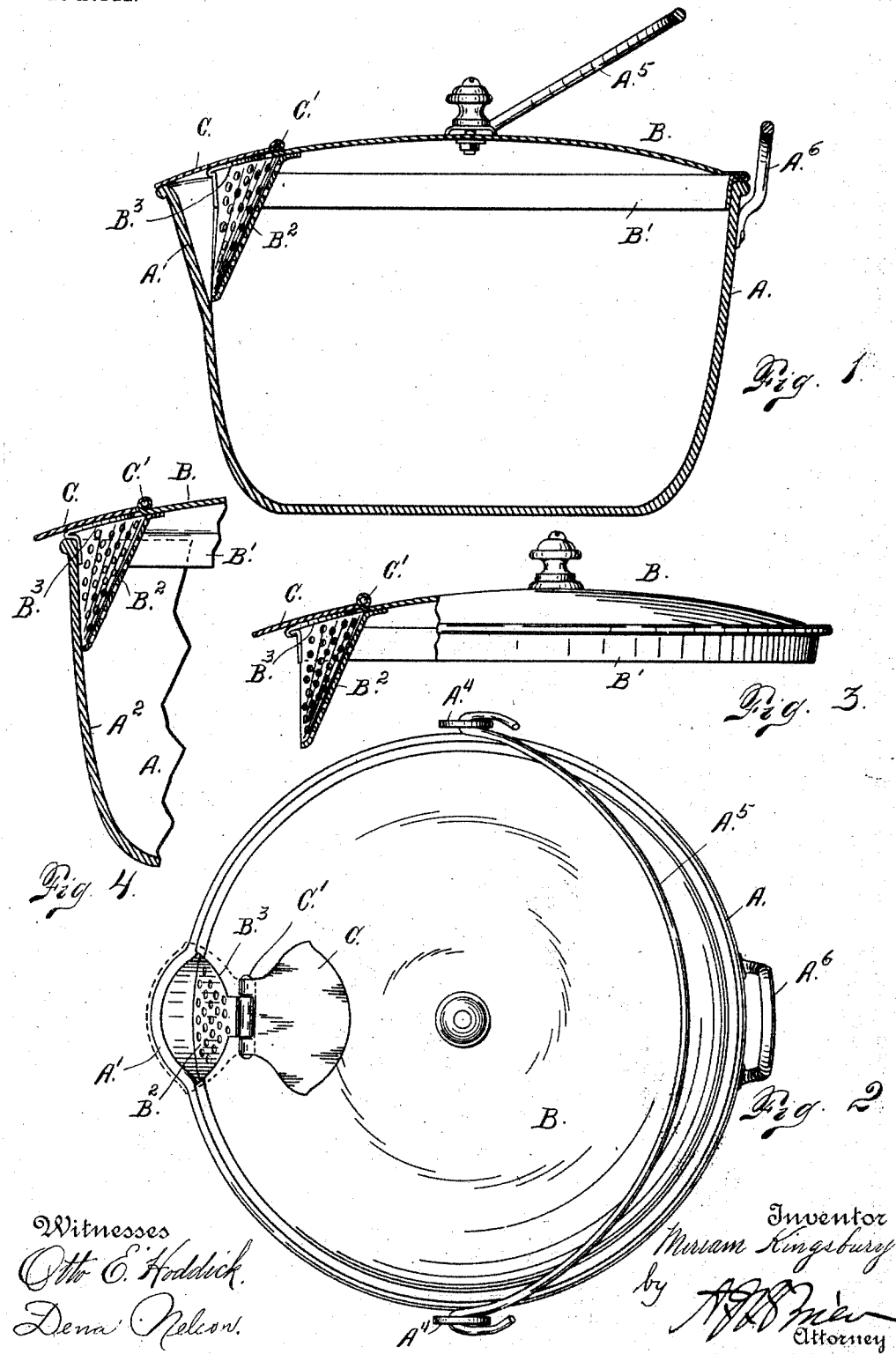

UNITED STATES PATENT OFFICE.

MIRIAM KINGSBURY, OF DENVER, COLORADO, ASSIGNOR OF ONE-HALF TO AGNES R. McCARTHY, OF DENVER, COLORADO.

COVER FOR KETTLES.

SPECIFICATION forming part of Letters Patent No. 776,917, dated December 6, 1904.

Application filed May 25, 1904. Serial No. 209,767. (No model.)

*To all whom it may concern:*

Be it known that I, MIRIAM KINGSBURY, a citizen of the United States of America, residing in the city and county of Denver and State of Colorado, have invented certain new and useful Improvements in Covers for Kettles or Cooking Vessels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in covers for kettles, stew-pots, or other cook vessels.

The important feature of my improved cover is a strainer attached to the cover in such a way that the cover is adapted for use either with a kettle having a spout or nozzle or with one which is perfectly plain, the cover above the strainer being cut away to permit the liquid to escape from a vessel having a plain edge as distinguished from one having a nozzle or spout. Above this opening is a small hinged lid which is of sufficient length to cover the nozzle or spout of the kettle as well as the opening in the lid when the cover is used with a vessel of this character. When used with a vessel having a plain edge, the extended lid is not necessary, but does no harm, as it simply projects slightly over the upper edge of the vessel. Hence the cover when made with the extended lid is adapted for use with either form of kettle or cooking vessel. Heretofore, so far as I am aware, no cover has been produced which is adapted for use with cooking vessels, whether plain or provided with spouts or nozzles, and it is also believed that no cover having a strainer has been produced and adapted for use with a kettle having a plain upper edge as distinguished from one having a nozzle or spout. By virtue of my improved construction the user of the vessel is free from the escape of steam, which when ordinary covers or lids are used is very annoying and liable to burn the hand of the user. The hinged lid of my improved cover opens readily to allow the liquid to escape, but forms a shield to prevent the steam from coming in contact with the hand of the user.

Having briefly outlined my improved construction as well as the function it is intended to perform, I will proceed to describe the same in detail, reference being made to the accompanying drawings, in which is illustrated an embodiment thereof.

In the drawings, Figure 1 is a section taken through a cooking vessel provided with a cover having my improvement. Fig. 2 is a top or plan view of the same, the lid or small hinged part adapted to cover the opening in the cover as well as the spout of the vessel being open, while in Fig. 1 this lid is closed. Fig. 3 is a detail view of my improved cover, partly in section. Fig. 4 shows the cover applied to a plain or unspouted vessel. This is a fragmentary sectional view taken through the side of the vessel where the strainer of the cover is located.

The same reference characters indicate the same parts in all the views.

Let A designate a kettle or cooking vessel of ordinary construction, the same being provided with a spout or nozzle $A'$, through which the liquid is intended to escape when poured from the kettle. My improved cover B is provided with the ordinary depending flange $B'$, adapted to fit into the top of the vessel. This flange, as well as the top of the cover, is cut away where the strainer $B^2$ is located, as shown at $B^3$, to permit the liquid to escape in the case of a vessel having no spout or of the construction shown in Fig. 4. In order to distinguish the two forms of cooking vessel, I will designate the construction shown in Fig. 4 as $A^2$. The strainer $B^2$ may be attached to the cover in any suitable manner and consists of a depending perforated metal part so located that it will pass down into the kettle or cooking vessel whether the same is provided with a spout or not. When the vessel is provided with a spout, this strainer is located in front of the spout and the liquid must pass through the perforations before escaping at the spout. Where the vessel is not provided with a spout, the liquid passes through the opening $B^3$ in the top of the cover after having passed through the strainer, which is located below the opening $B^3$. Adjacent the opening $B^3$ the cover is provided with a small lid C, hinged to the cover exteriorly, as shown at $C'$. This lid is made of sufficient size not only to cover the opening $B^3$ in the top of the cover, but also to cover the spout $A'$ when the vessel is provided with a spout.

From the foregoing description the use of my improved device will be readily understood. The cover equipped with my improvements is applied to the top of the kettle or cooking vessel in the ordinary way. If the vessel is provided with a spout, the cover is so placed that the strainer is brought in front of the spout, while the opening $B^3$ registers or is coincident with the nozzle-opening. When the vessel is not provided with a spout, the cover may be placed in any desired position, since the liquid may be poured from the vessel through the opening $B^3$ regardless of the location of the strainer. For convenience, however, the cover should be so placed that the strainer will be located intermediate the ears $A^4$ for the bail $A^5$ and directly opposite the handle $A^6$. In pouring off the water or other liquid from the kettle the liquid opens the lid C sufficiently to permit the liquid to escape, after which the lid of course closes automatically as soon as the kettle is returned to its upright or normal position.

Having thus described my invention, what I claim is—

A circular cover having a recess formed in the edge thereof, and a hinged lid projecting beyond the recess to cover a kettle-nozzle, the cover having a depending strainer located with the circle of the cover whereby it is adapted to enter a circular kettle at any point, the cover being thus adapted for use with kettles either with or without nozzles.

In testimony whereof I affix my signature in presence of two witnesses.

MIRIAM KINGSBURY.

Witnesses:
AGNES McCARTHY,
FRANK L. GALIGHER.